Figures 1, 2:
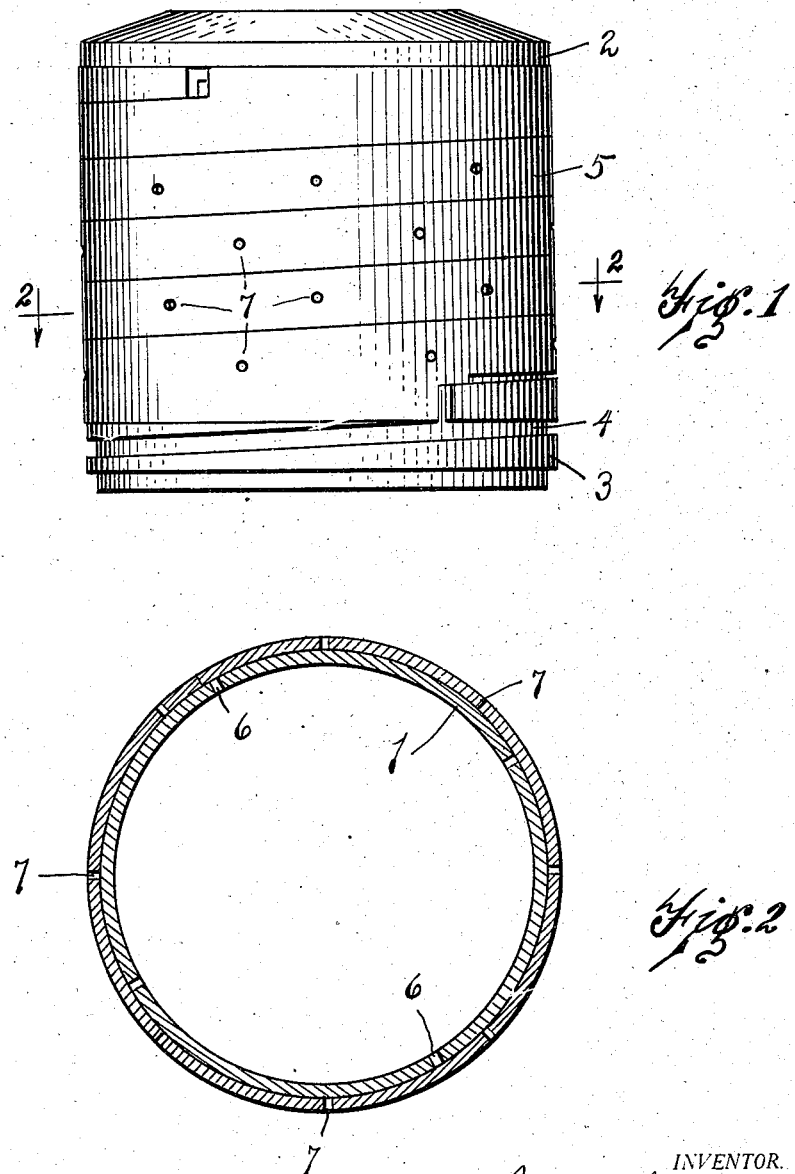

Dec. 14, 1926.  
J. STUNGO  
1,611,085

PISTON

Filed July 16, 1926

INVENTOR.  
Joseph Stungo  
BY Edward N. Pagelsen  
ATTORNEY.

Patented Dec. 14, 1926.

1,611,085

UNITED STATES PATENT OFFICE.

JOSEPH STUNGO, OF DETROIT, MICHIGAN, ASSIGNOR OF ONE-HALF TO CHARLES R. TALBOT, OF DETROIT, MICHIGAN.

PISTON.

Application filed July 16, 1926. Serial No. 122,798.

This invention relates to the construction of pistons for internal combustion engines, particularly to that type of piston wherein a spiral band of metal extending for a considerable portion of the length of the piston and constituting a number of circumferential wraps, takes the place of the usual piston rings, and its object is to so construct the piston and its spiral band-ring that the surfaces of the spiral-ring may be lubricated and prevented from "seizing" with the outer surface of the piston and with the inner surface of the cylinder in which the piston reciprocates.

In the accompanying drawing, Fig. 1 is an elevation of a piston embodying the present invention. Fig. 2 is a section on the line 2—2 of Fig. 1.

Similar reference characters refer to like parts in both views.

The piston shown in the drawing comprises a body and a spiral band wrapped on the body. The body 1 is generally cylindrical with the usual bosses (not shown) on the inside to receive the piston pin. At its upper end is formed a circumferential flange or shoulder 2 while at the bottom is a flange or shoulder 3 formed with a helical groove 4.

The spiral band 5 takes the place of the usual piston rings. It may be formed from a sleeve of cast iron which is slit along a spiral line and then sprung open sufficiently to slip over the end of the piston body. When the piston is to be inserted in a cylinder, the spiral band must be contracted by properly twisting it, in order that its resilience will cause proper pressure between it and the cylinder wall.

I have found that when a piston of this character becomes heated in a cylinder, that the closeness of the fit between the outer surface of the spiral band and the cylinder wall so interferes with proper lubrication that both the band and the cylinder wall are in danger of injury. I have also found that when a piston of this character is in operation, the spiral band slides around the body and thus wears evenly and wears the cylinder wall evenly. In order to facilitate this rotary movement, and to prevent the band "seizing" on the body of the piston, and to provide proper lubrication for the contacting surfaces of the band and cylinder, I have provided oil holes 6 in the wall of the piston body and other holes 7 in the spiral band so that lubricant splashed up into the piston in the usual manner may flow out through these perforations and coat the outer surface of the piston body and the inner surface of the spiral band and also penetrate to the surface of the cylinder.

The number and position of these perforations in both the piston body and spiral band, and the sizes thereof, will be determined for each different size of piston by those skilled in the art.

I claim:—

1. A piston for internal combustion engines comprising a hollow substantially cylindrical body having circumferential shoulders spaced apart longitudinally of the body, and a spiral band of resilient metal mounted on the body between said shoulders, said piston body and said spiral band being perforated to permit the passage of lubricant.

2. A piston for internal combustion engines comprising a hollow body having circumferential shoulders at its ends, and a spiral metal band mounted on the body for circumferential movement between said shoulders and constituting a resilient sleeve, said body and band being perforated to permit the passage of lubricant from the interior of the body to the space within the sleeve and from that space to the exterior surface of the sleeve.

JOSEPH STUNGO.